United States Patent

Niessner

[11] 3,888,539

[45] June 10, 1975

[54] SELF-CONTAINED KITCHEN UNIT FOR A VAN TYPE VEHICLE

[76] Inventor: Robert A. Niessner, 2280 Summit Drive, Hillsborough, Calif. 94010

[22] Filed: Apr. 16, 1973

[21] Appl. No.: 351,520

[52] U.S. Cl. ............ 296/23 D; 296/23 MC; 296/22; 296/26
[51] Int. Cl. .............................................. B60p 3/32
[58] Field of Search .......... 296/23 MC, 23 R, 23 D, 296/22, 24 A, 23 C, 26

[56] References Cited
UNITED STATES PATENTS

| | | | |
|---|---|---|---|
| 2,329,419 | 9/1943 | Reed | 296/23 R |
| 2,855,240 | 10/1958 | Toland | 296/23 D |
| 2,893,780 | 7/1959 | Ervine | 296/23 C |
| 3,420,566 | 1/1969 | Obra | 296/23 MC |
| 3,544,152 | 12/1970 | Low | 296/023 |
| 3,730,580 | 5/1973 | Page | 296/23 R |

FOREIGN PATENTS OR APPLICATIONS

| | | | |
|---|---|---|---|
| 2,026,360 | 12/1971 | Germany | 296/23 C |

Primary Examiner—Robert B. Reeves
Assistant Examiner—H. Grant Skaggs, Jr.
Attorney, Agent, or Firm—Owen, Wickersham & Erickson

[57] ABSTRACT

A self-contained kitchen unit for a van type vehicle is built to fit through the rear door opening of the vehicle. The kitchen unit has built-in kitchen facilities. It is mounted in the vehicle by guide members attached to the vehicle floor and by coacting support rails and rollers in the sidewalls of the kitchen unit.

The kitchen unit fits entirely within the back of the vehicle with the rear doors closed for travel. The kitchen unit can be completely removed and stored when it is not needed in the vehicle.

In the use of the kitchen unit, the unit is pulled part way out the rear door opening after the vehicle has been parked; and in this position the rails support the kitchen unit in cantilever fashion from the vehicle floor.

Part of the floor of the kitchen can be lowered to ground level to provide standup space in the kitchen unit when the kitchen is in use.

25 Claims, 16 Drawing Figures

PATENTED JUN 10 1975　　　3,888,539

SHEET 1

PATENTED JUN 10 1975  3,888,539

SHEET 2

PATENTED JUN 10 1975
3,888,539
SHEET 4
FIG. 8
FIG. 9
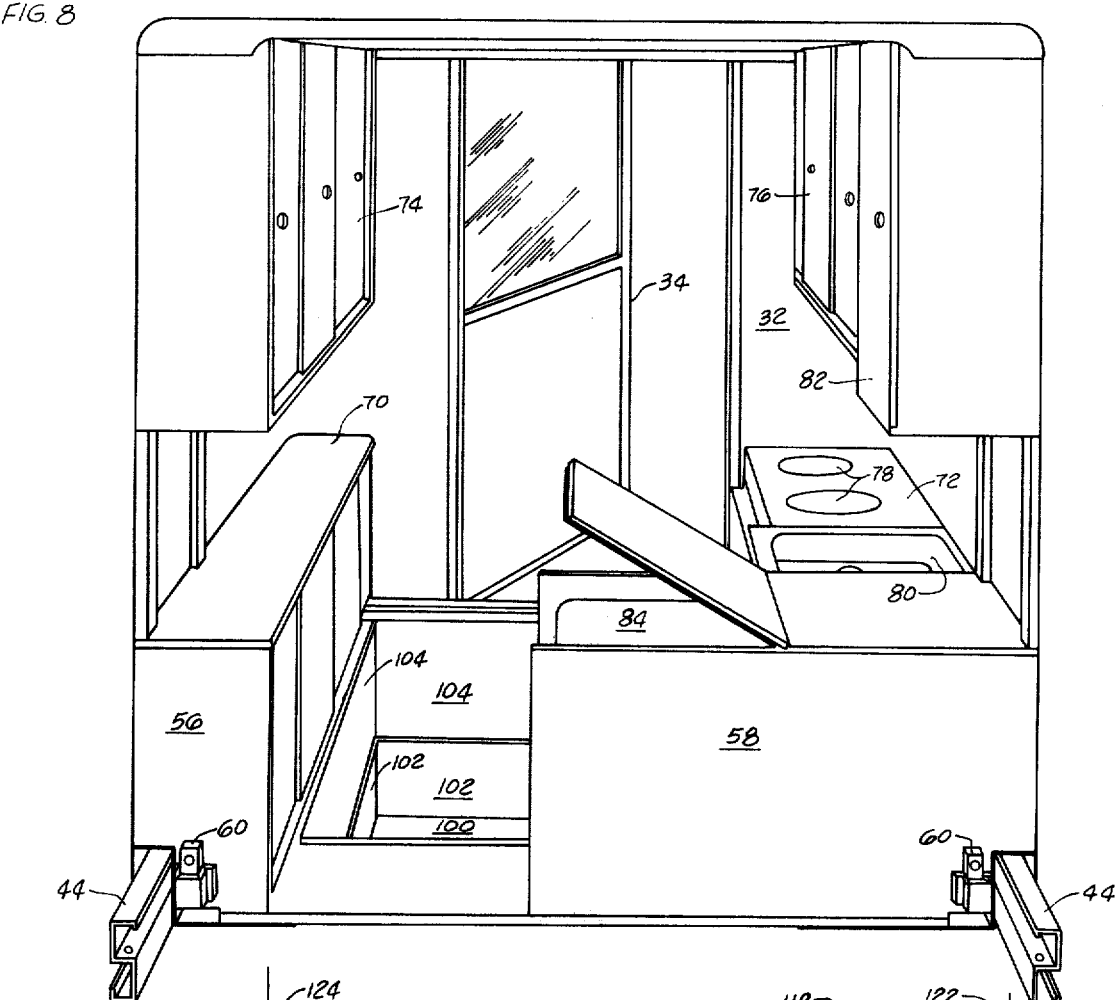
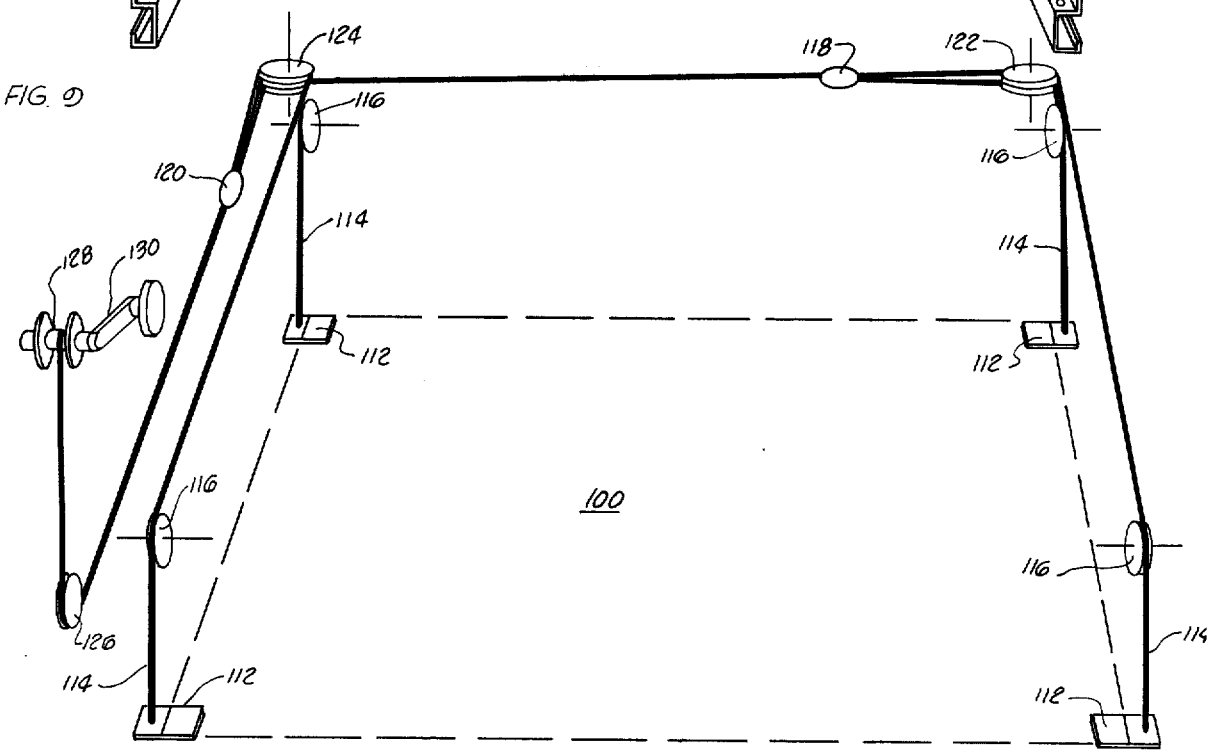

PATENTED JUN 10 1975 3,888,539

SHEET 5

SELF-CONTAINED KITCHEN UNIT FOR A VAN TYPE VEHICLE

BACKGROUND OF THE INVENTION

This invention relates to a kitchen unit for a vehicle and particularly to a self-contained kitchen unit for a van type vehicle.

The past few years have seen a tremendous increase in the development and use of recreational vehicles for camping.

A wide variety of campers for pickup trucks have been developed.

Another line of development has been the modification of vans, particularly the Dodge Tradesman line, to build in kitchen and sleeping facilities. Some modifications commonly involve alterations to the vehicle body itself and often result in permanent installations of the built-ins in the vehicle body.

Trailers of various types have, of course, been used for many years.

All of these prior art approaches to recreational camper vehicles have drawbacks.

For example, pickup campers are often heavy and bulky in order to provide the desired standup space. The pickup-camper combination also has limited passenger space since most pickups usually have only one seat in the cab.

The modifications to vans are quite often expensive. Because such modifications are usually built in, they reduce or eliminate the utility of the van for other purposes, such as carrying cargo or passengers.

Trailers present problems of their own because of the fact that they must be towed.

SUMMARY OF THE INVENTION

It is a primary object of the present invention to overcome the problems of the prior art by constructing a small, self-contained kitchen unit that can be easily put into and taken out of the back of a van. The kitchen unit is put into the van when the van is used for camping. It can easily be removed from the van when the van is to be used for some other purpose.

It is a closely related object to construct such a kitchen unit with a floor that can be lowered to provide standup space for working in the kitchen.

The kitchen unit of the present invention is a self-contained unit. Two sidewalls are connected by a floor and a ceiling to form a rectangular module which can be put into a van through the rear door opening.

The kitchen unit includes all kitchen facilities — a stove, sink, water, and an ice chest. The kitchen facilities are built into counters and cabinets in the sidewalls.

The kitchen unit is mounted in the vehicle by guide members attached to the vehicle floor and support members in the kitchen unit sidewalls and slidable within the floor mounted guide members. In the use of the kitchen unit the unit is pulled part way out of the vehicle through the rear door opening while supported on the rails in cantilever fashion. A part of the floor is then lowered to ground level, and this provides standup space for working in the kitchen unit.

When a stay at a particular location is over, the part of the floor that has been lowered is raised back to its original level by a cable and windup reel arrangement. The kitchen unit is then pushed back into the inside of the van.

The vehicle mounted guide members include slight ramps at the forward end of the guide members. The ramps raise the forward end of the kitchen unit off of the support rails and rollers to prevent shifting during travel. Latches are also engaged to lock the kitchen unit firmly in place while the vehicle is in motion.

The counter surfaces are so arranged that a tabletop can be associated with the counter tops to provide an extended flat surface for sleeping when the kitchen is not in use.

The kitchen unit can be completely removed from the vehicle, and this can be done very simply, by removing a stop from between the rail members and guide members. This then leaves the vehicle free of any built-in modifications, except for the floor mounted guide members (which can also be removed if desired); and the vehicle is ready for general purpose use.

Kitchen unit structural features effective to function in the ways described above constitute further, specific objects of the present invention.

Other objects, advantages and features of my invention will become apparent from the following detailed description of one preferred embodiment taken with the accompanying drawings.

BRIEF DESCRIPTION OF THE DRAWINGS

FIG. 4 also shows how the dolly helps to align the mounting rails of the kitchen unit with corresponding guide members connected to the floor of the van;

FIG. 6 shows the lowerable floor portion in its upper position;

FIG. 8 is a perspective view like FIG. 6 but shows the floor lowered to provide standup space for working in the kitchen unit;

FIG. 9 is a schematic view showing the cable mechanism for raising and lowering the floor of the kitchen unit;

FIG. 10 also shows how a double panel cover for the ice chest is opened to extend the flat upper surface;

DESCRIPTION OF THE PREFERRED EMBODIMENTS

FIGS. 1–5 show a van type vehicle 20 in which a self-contained kitchen unit 22 constructed in accordance with one embodiment of the present invention can be installed.

Figure 4:
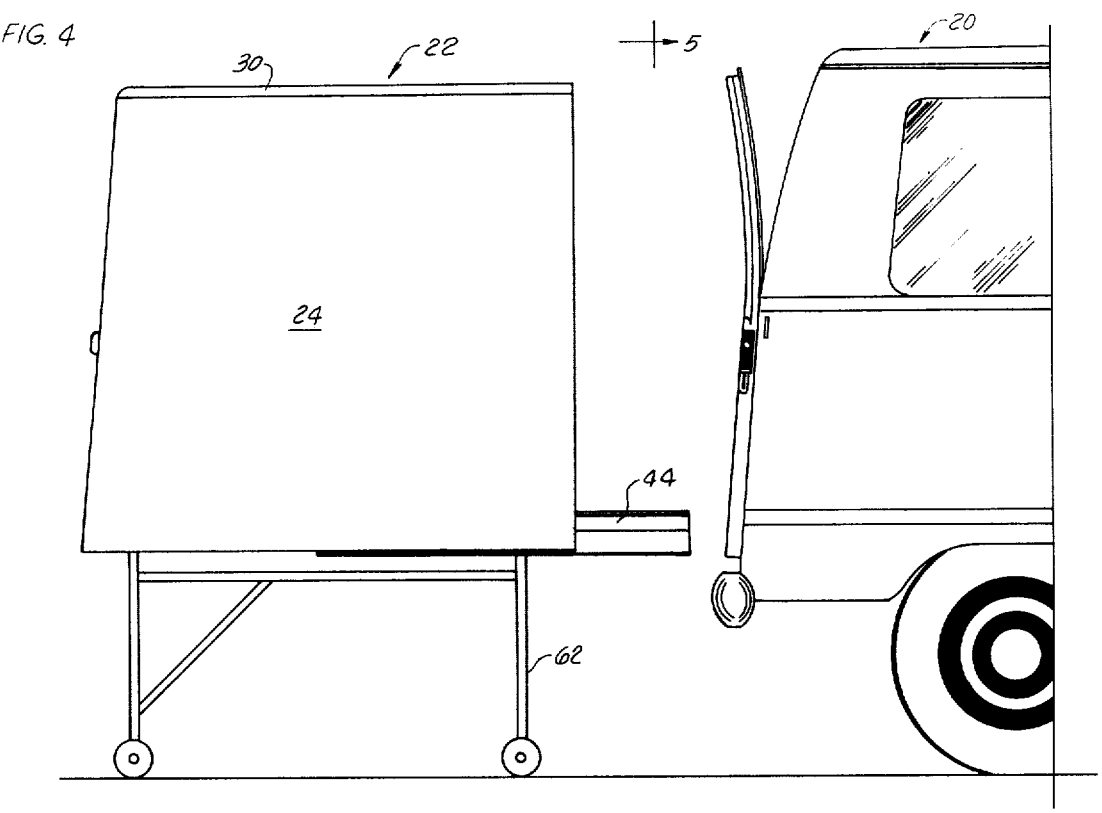
FIG. 4 is a side elevation view showing how a dolly is used to carry the kitchen unit when the kitchen unit is completely removed from the van.

As illustrated in the drawings the van vehicle is a ½ to 1-ton commercial or sports van, and the kitchen unit 22 can be used with any existing wheelbase since the overall length of the kitchen unit, as best illustrated in FIG. 4, is relatively short and takes up a minimum of the interior space of the van.

The kitchen unit 22 is a rectangular module having sidewalls 24 and 26 (see FIG. 6), a floor 28 and a ceiling 30.

The kitchen unit also has a back wall 32 with a door 34.

Figure 6:
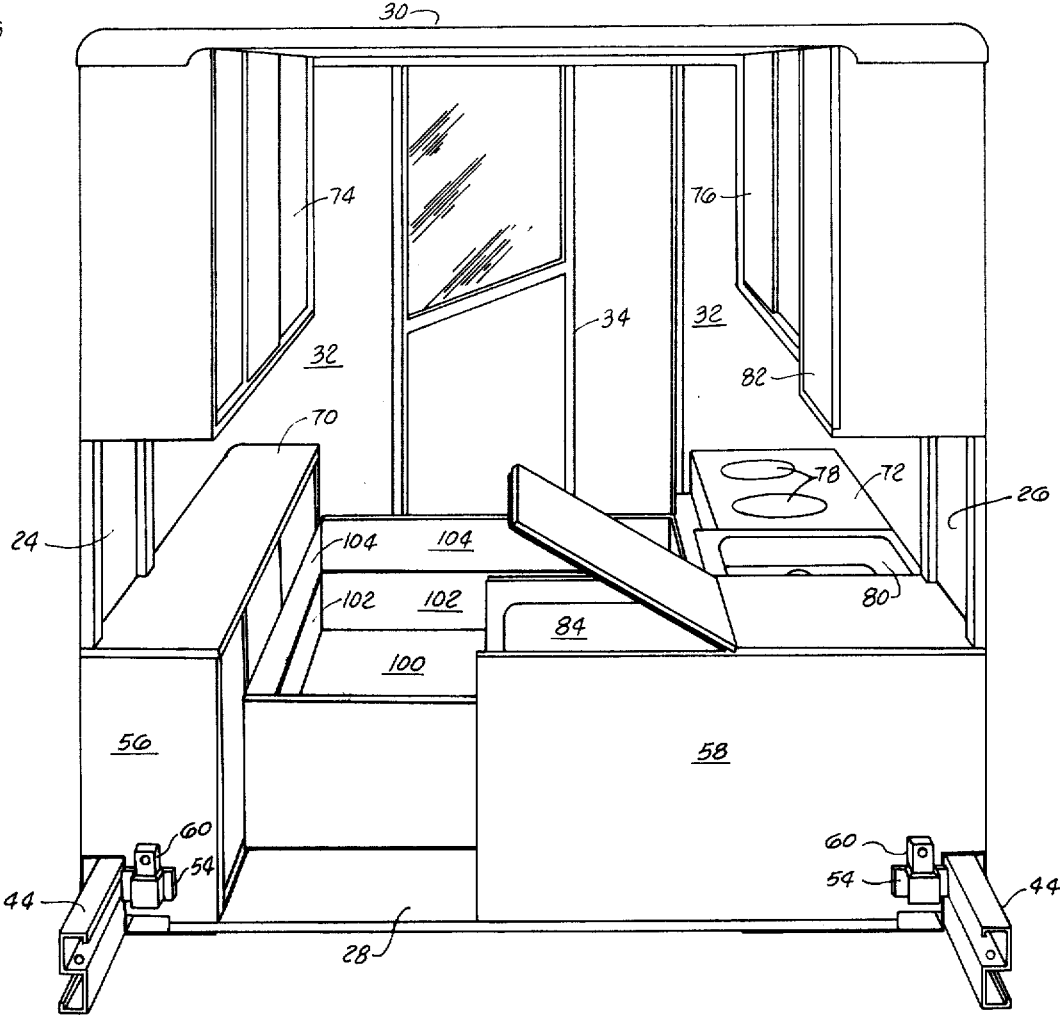
FIG. 6 is a perspective view of the inside of the kitchen unit shown in FIGS. 1–3 and is taken from the inner end of the kitchen unit.
Figure 10:
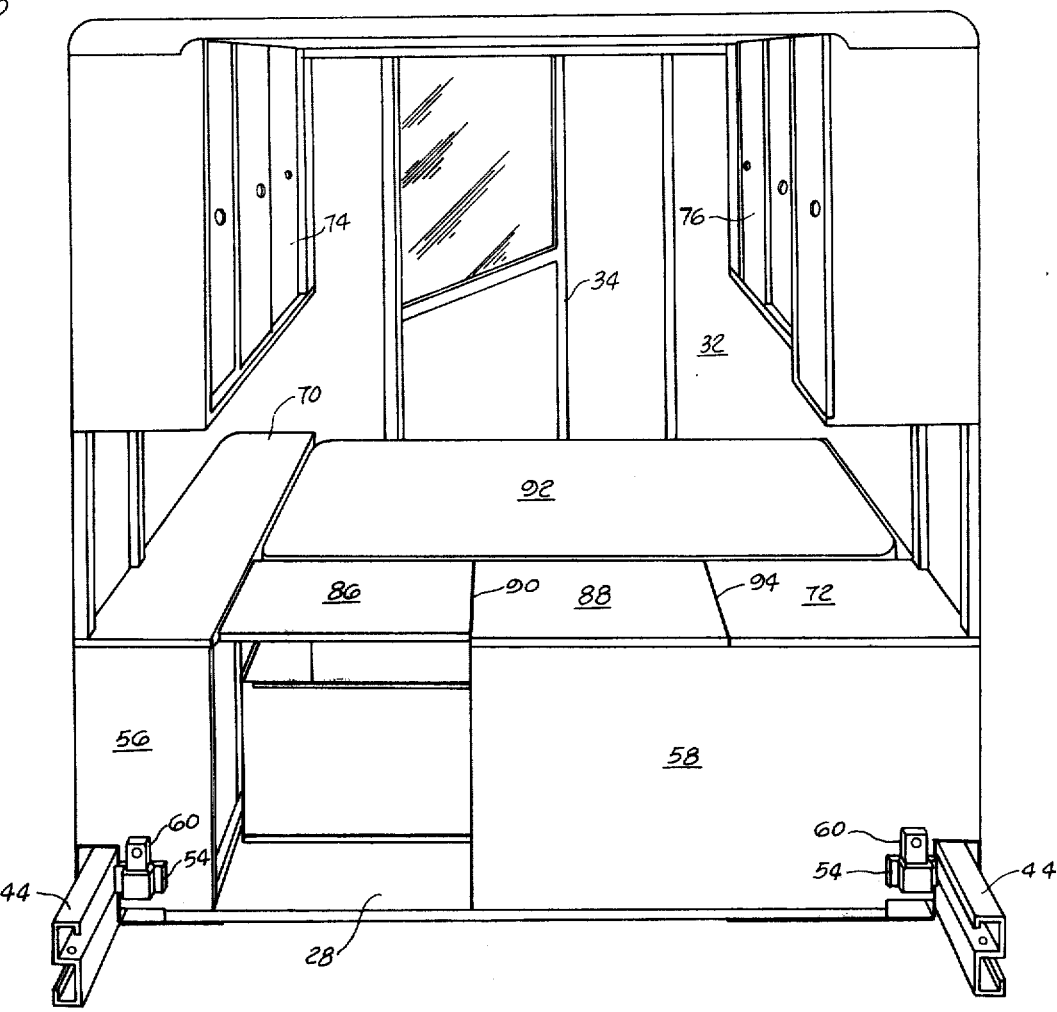
FIG. 10 is a perspective view like FIG. 6 showing how a tabletop is placed over the stove and sink to provide a flat upper surface for sleeping space.

The inner end of the kitchen unit is open, as illustrated in FIGS. 6, 8 and 10.

The kitchen unit 22 is constructed to fit within the rear door opening 36 in the vehicle. Weather stripping 37 (see FIGS. 2 and 3) may preferably be used to seal any gap between the outer surface of the kitchen unit and the door opening 36 when the kitchen unit is moved to the operative position shown in FIG. 3.

Figure 5:
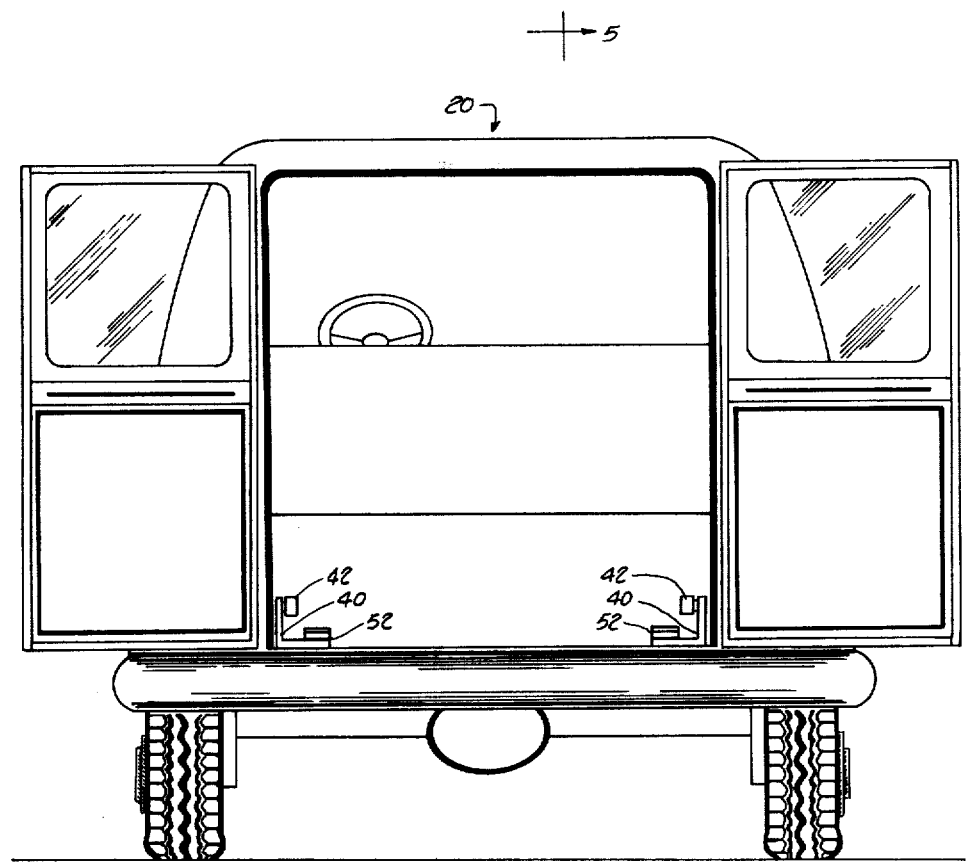
FIG. 5 is a rear elevation view, taken along the line and in the direction indicated by the arrows 5—5 in FIG. 4. This view shows the guide members mounted on the floor of the van, the only modification required to the van itself.
Figure 7:
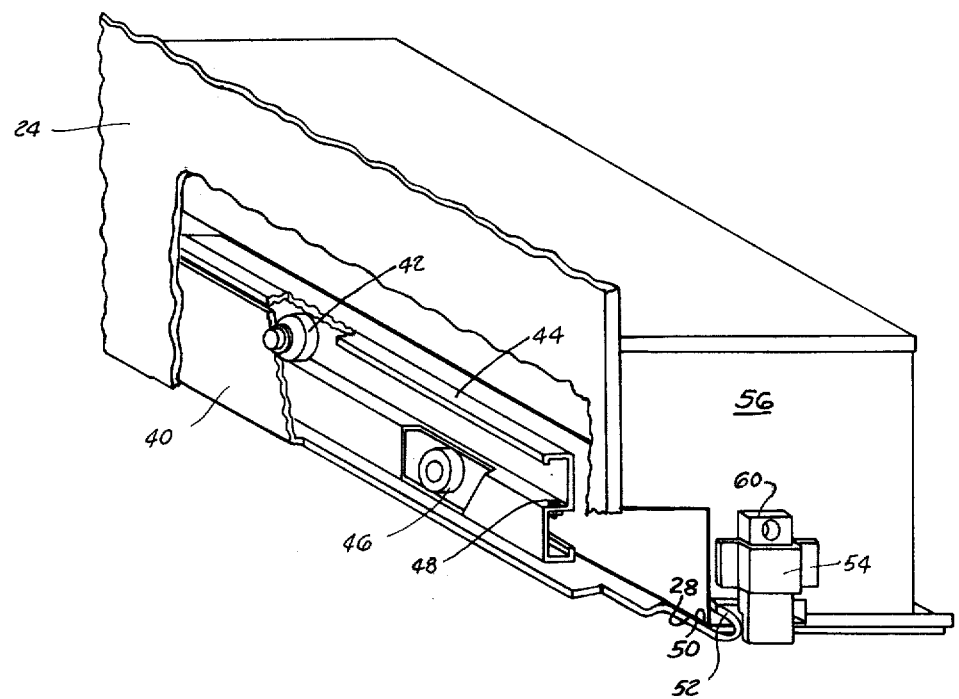
FIG. 7 is an enlarged isometric view, partly broken away to show details of construction, of the guide, roller and rail support structure for mounting the kitchen unit in the vehicle.

The kitchen unit 22 is mounted in the vehicle by a guide rail and roller construction which is best shown in FIGS. 5 and 7.

As shown in FIG. 5 a pair of guide members 40 are attached to the floor of the vehicle. Each guide member has a vertically extending flange mounting a set of rollers 42.

Rail members 44 roll on the rollers 42 and on rollers 46 which are mounted on shafts in the sidewalls 24 and 26.

As illustrated in FIG. 7 the rail members 44 are double track members and have an S-shape in cross section. The upper track rolls on the rollers 42 while the lower track rolls on the rollers 46. Each rail member 46 thus moves at one-half of the speed of the sidewall.

Figure 1:
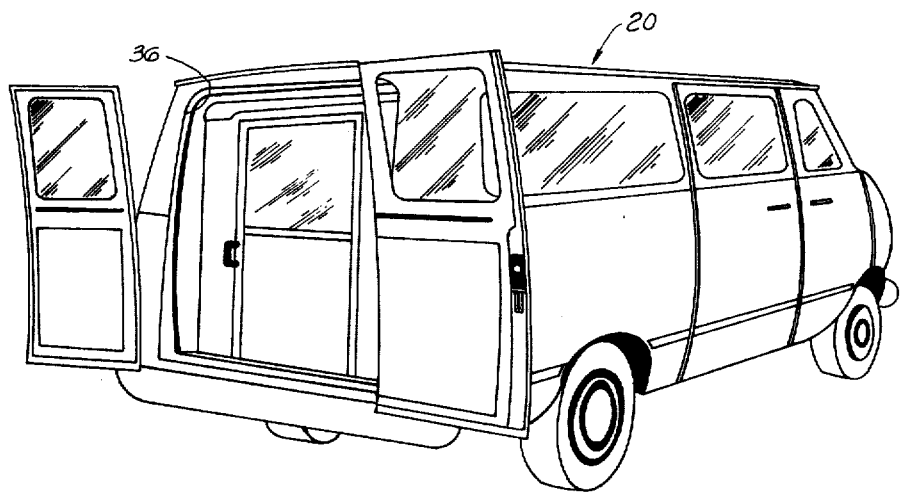
FIG. 1 is a perspective view of a van vehicle with a kitchen unit constructed in accordance with one embodiment of the present invention installed within the back part of the vehicle body.
Figure 2:
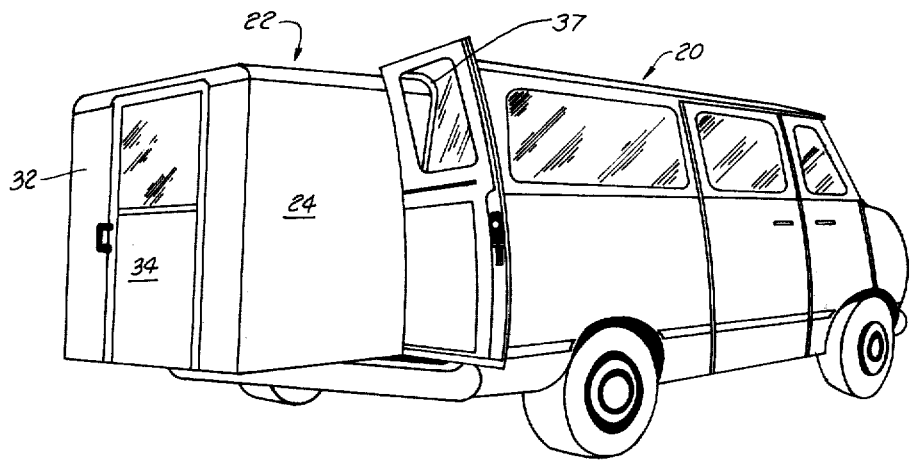
FIG. 2 is a perspective view like FIG. 1 showing the kitchen unit moved out the back of the van to the position in which the floor can be lowered.
Figure 3:
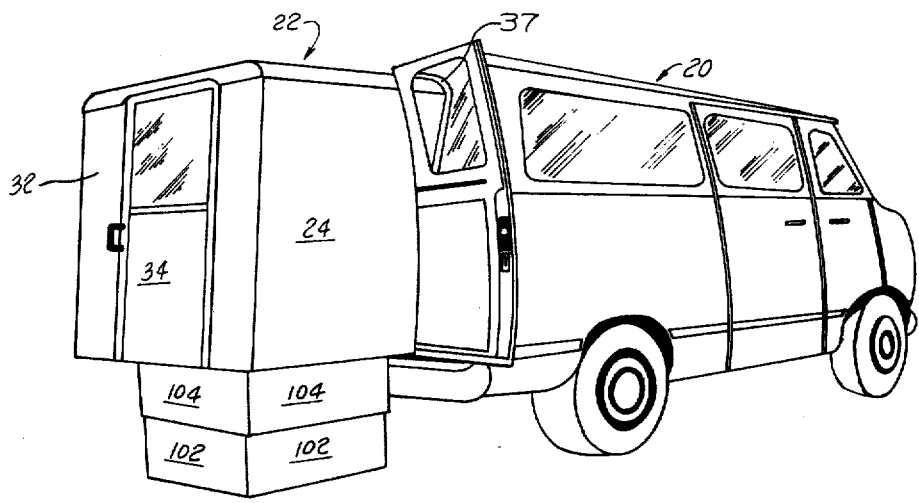
FIG. 3 is a view like FIG. 2 showing the floor section of the kitchen unit lowered to ground level with the kitchen unit ready for use as a standup kitchen.

These mounting means are of sufficiently heavy section to support the kitchen unit in cantilever fashion in the positions illustrated in FIGS. 2 and 3.

A bolt 48 is removably mounted in the top track of each rail member 44 as illustrated in FIG. 7. This bolt acts as a stop to limit the extent to which the kitchen unit 22 can be drawn out of the back of the vehicle. The bolt can be removed, and when the bolt is removed the kitchen unit 22 can be completely removed from the vehicle by sliding the rail members 44 out of the guide members 40.

The innermost ends of the guide members 40 have a slight build-up or ramp in the floor mounted flange as indicated by the reference numeral 50 in FIG. 7. The front edge of the floor frame of the kitchen unit is lifted by this ramp 50 when the kitchen unit 22 is moved to its full forward position within the vehicle. This transmits the support from the floor of the vehicle directly to the frame of the kitchen unit and removes the load-bearing contact between the rollers 42 and 46 and the rail members 44 and thereby minimizes the tendency of the kitchen unit to shift longitudinally within the vehicle when the vehicle is moving.

The front edge of the floor or frame of the kitchen unit 22 also engages a stop 52 to limit the forward movement of the kitchen unit. The stop 52 can be formed by bending back a part of the floor flange of the guide member 40 as illustrated in FIG. 7.

A pair of latches 54 are mounted on the inner ends 56 and 58 of the counters and cabinets. Each latch has a vertically movable locking member 60 which engages the front end of the stop 52 to lock the kitchen unit 22 in its forwardmost position.

The locking pieces 60 are raised to the position illustrated in FIG. 6 when the kitchen unit is to be moved back out of the vehicle.

As illustrated in FIG. 4 a dolly 62 is used to carry the kitchen unit 22 when the kitchen unit is to be stored. The dolly 62 also is useful to line up the rail members 44 with the guide members 40 for installation of the kitchen unit in the vehicle 20.

The kitchen unit 22 has all kitchen facilities built in. As illustrated in FIGS. 6, 8 and 10 a counter 70 is built into the sidewall 24 and a counter 72 is built into the sidewall 26. A cabinet 74 is built in above the counter 70 and a cabinet 76 is built in above the counter 72. Additional cabinet space is built in beneath the counters 70 and 72 as illustrated.

Stove heating units 78 are built into the counter 72, and a sink 80 is also built into the counter 72.

The upper cabinets 76 include an offset water chest 82 which has a spigot over the sink 80.

The counter 72 includes a space 84 for an ice chest.

As best illustrated in FIG. 10 the cover for the ice chest includes two panels 86 and 88 which are connected together in a hinged connection 90 so that the panel 86 may be swung over to the position illustrated in FIG. 10 to line up with the counter top 70 and to provide a flat surface across the entire width of the kitchen unit as illustrated.

A table top 92 fits over the top of the part of the counter 72 having the stove heating units 78 in the sink 80 to cover these units and to align with the counter top 70 as illustrated in FIG. 10. Thus, the entire inner area of the kitchen unit at the level of the counter tops 70 and 72 can be turned into a flat surface for sleeping.

The panel 88 is connected to the counter top 72 by hinged connection 94 which permits the two panels 86 and 88 to be raised, as illustrated in FIGS. 6 and 8 to provide access to the ice chest within the compartment 84.

Figure 12:
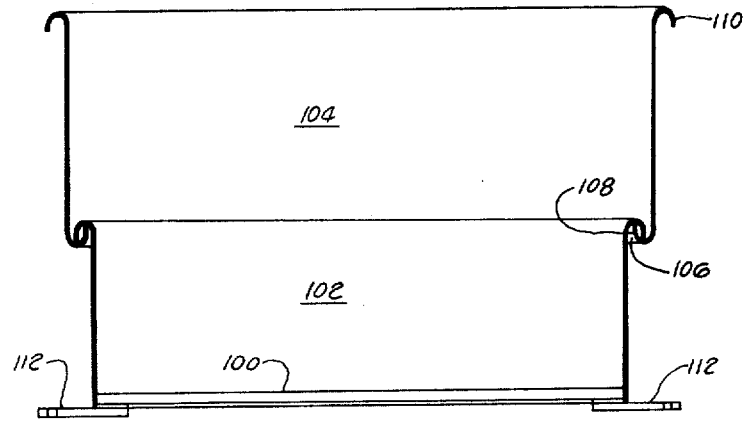
FIG. 12 is an elevation view taken along the line and in the direction indicated by the arrows 12—12 in FIG. 11 and shows how sidewalls for the floor portion are constructed in two telescoping sections. This construction maintains enclosure of the lowered floor and minimizes the vertical space required for the raised floor.

In accordance with the present invention the floor 28 of the kitchen unit 22 includes a part 100 which can be lowered to ground level, as illustrated in FIG. 3, to provide standup space for working in the kitchen. This part of the floor is maintained enclosed by sidewall sections 102 and 104. The sections 102 telescope within the sections 104 to minimize the height of these sections within the interior of the kitchen unit. As illustrated in FIG. 12 the sections 102 have downturned upper edges 106 which engage upturned lower edges 108 of the upper panels 104. The upper edges of the sections 104 have downturned edges 110 which engage the main floor surface 28.

A flange 112 is connected to each corner of the floor part or pan 100, and these flanges 112 provide points of attachment for cables 114 (see FIG. 9). Each individual cable 114 is trained over a pulley 116 and the individual cables are connected together at points 118 and 120, as illustrated, after passing over multicable guide pulleys 122 and 124 at the back corners of the kitchen unit. The joined cable then passes over a direction change pulley 126 and to a windup reel 128. In a specific form of the present invention the windup reel 128 is rotated by a hand crank 130 to raise and to lower the floor pan 100. This reel can of course be operated by a motor if desired.

Figure 15:
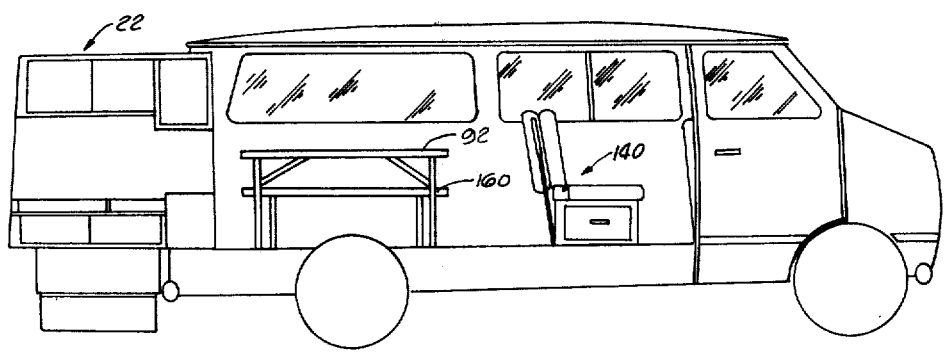
FIG. 15 is a view like FIGS. 13 and 14 showing the rear facing seat back moved forward to provide space for a table within the vehicle.
Figure 16:
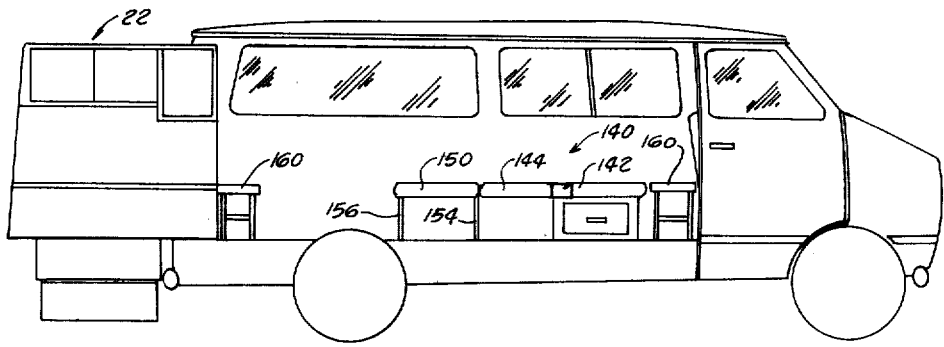
FIG. 16 is a view like FIGS. 14 and 15 showing the bench seat folded flat and the tabletop placed in the kitchen unit to provide sleeping areas.

FIGS. 13–16 are side elevation views illustrating how the kitchen unit of the present invention is combined with a dual purpose bench seat (indicated generally by the reference numeral 140 in FIGS. 13–16) to provide (a) excellent seating capacity with the kitchen unit in its travel position (FIG. 13), (b) room for enclosed dining within the vehicle with the kitchen unit in its operative position (FIG. 15) and (c) extensive space for sleeping when the seat is folded flat and the table top is associated with the counter tops of the kitchen unit (FIG. 16).

Figure 13:
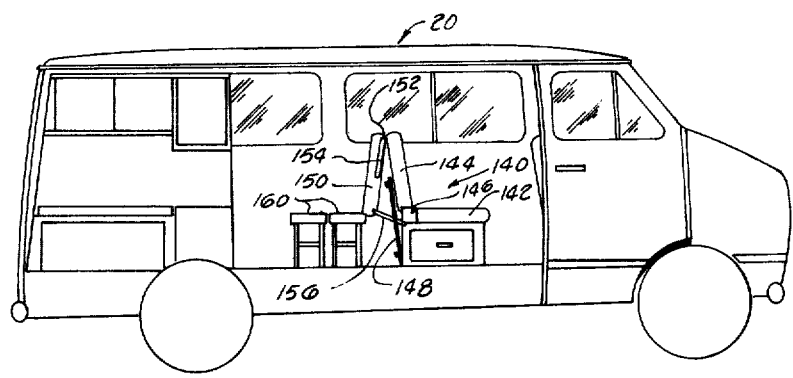
FIG. 13 is a side elevation view showing how a dual purpose bench seat is associated with the kitchen unit of the present invention to provide both forward facing and rearward facing seating with the kitchen unit completely contained within the vehicle.
Figure 14:
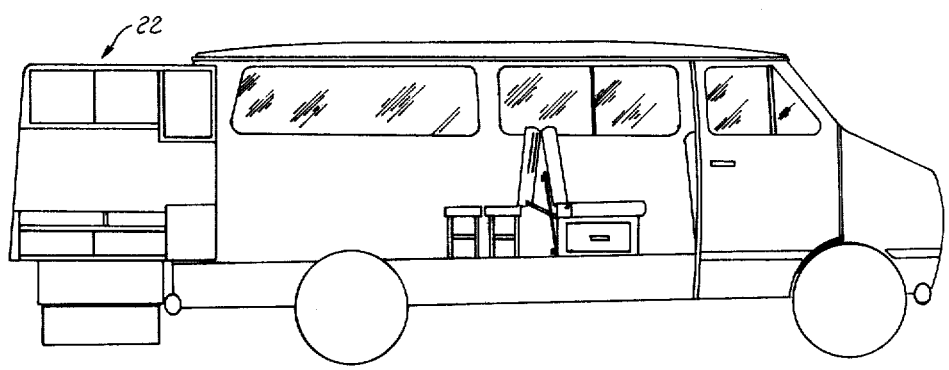
FIG. 14 is a view like FIG. 13 showing the kitchen unit moved out to the position where it is ready for use as a kitchen.

As illustrated in FIG. 13 the bench seat 140 has a forward facing seat and a rearward facing seat.

The forward facing seat has a bottom seat cushion 142 and a seat back 144. The seat back 144 is connected to the bottom seat cushion 142 by a hinged connection 146. The seat back 144 is held in the upright position illustrated in FIG. 13 by a brace 148.

The rear facing seat has a seat back 150. The seat back 150 is connected along its upper edge to the upper part of the forward facing seat back 144 by a hinged connection 152.

A support leg 154, for supporting the seat back 150 from the floor in the folded down position illustrated in FIG. 16, has an upper end pivotally connected to the top of the seat back 150. One such brace is located at each end of the seat back 150.

A second brace 156 is connected to the lower end of the seat back 150 in a pivot connection. The other end of the brace 150 is latched to the frame for the forward facing seat when the seat back 150 is in the upright position illustrated in FIG. 13. One brace 156 is located at each end of the seat back 150. The braces 156 are disconnected from the frame and are folded up parallel to the seat back 150 in the position illustrated in FIG. 15 to swing the seat back 150 flat up against the back of the seat back 144 to provide increased room for dining within the vehicle.

Figure 11:
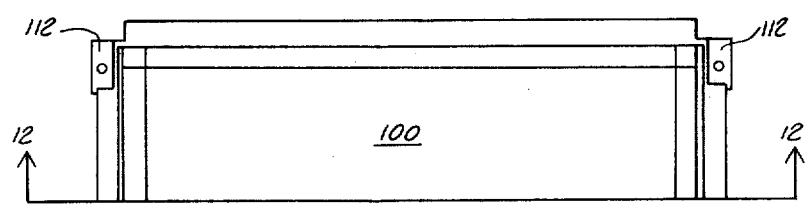
FIG. 11 is a fragmentary plan view of the part of the kitchen unit floor that can be lowered.

The seat portion of the rearward facing seat is formed by two benches 160. The benches 160 are used in combination with the table 92 as illustrated in FIG. 15 and are separated and used to provide larger sleeping areas as illustrated in FIG. 16. Thus, with the seat 140 folded flat as illustrated in FIG. 16, one bench 160 is placed in front of the seat cushion 142 to increase the length of the flat upper surfaces provided by the folded flat bench seat 140. The other bench 160 is placed up against the ends of the counters 70 and 72 to provide an extension of the upper flat surface formed by placing the tabletop 92 in the position illustrated in FIG. 11 and folding the panels 86 and 88 of the ice chest compartment out to the positions illustrated in FIG. 10.

The self-contained kitchen unit of the present invention thus offers a number of novel and advantageous features. It can be easily and quickly installed in the vehicle when the vehicle is to be used for a camper. It can be easily and quickly removed from the vehicle when the vehicle is to be returned to general purpose use. The kitchen unit is axially and vertically compact so that it can be completely contained within the vehicle without any modifications to the vehicle body. Because it is so axially compact, it can be combined with a forward and rearward facing bench seat as illustrated in FIG. 13 to provide comfortable seat space for five to seven passengers in addition to the driver. The kitchen unit can be set up quickly, and the lowered floor provides standup space within the kitchen unit. The built-in features of the kitchen unit are so arranged that the kitchen unit can be quickly converted to provide sleeping space at night.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A self-contained kitchen unit for insertion through the rear opening of a vehicle having a body providing an enclosed space behind the driver and rear doors providing a rear opening in the body which is substantially the full interior height and width of the vehicle body, said kitchen unit comprising, two sidewalls, a rear end wall, a ceiling, and a floor joined together to provide a kitchen unit which is itself completely enclosed except for a front end open to the interior of the vehicle, kitchen facilities adjacent the inner side of at least one of the walls, mounting means for mounting the kitchen unit in the vehicle for movement between a first, transport position in which the unit is completely contained within the vehicle and a second, operative position in which a substantial part of the enclosed unit extends outside the rear opening of the vehicle with a forward end portion of the kitchen unit retained within the vehicle to provide, in said operative position, a kitchen space behind the vehicle which is enclosed by the kitchen unit in combination with the vehicle body, said floor having a drop down part, and floor lowering means for lowering the drop down part of the floor to ground level in the second, operative position to provide stand up space in that part of the kitchen unit, and wherein the drop down part of the floor is so located with respect to said kitchen facilities as to provide access to the kitchen facilities in a working relation when the drop down part of the floor is lowered to provide such stand up space.

2. The invention defined in claim 1 wherein the mounting means include guide members attached to the floor of the vehicle and rail members attached to the sidewalls and movable within the guide members.

3. The invention defined in claim 2 wherein the mounting means include rollers coacting with the guide members and rail members and wherein the mounting means cantilever support the kitchen unit from the vehicle body in the operative position.

4. The invention defined in claim 2 including locking means for locking the kitchen unit in the first, transport position.

5. The invention defined in claim 2 including ramp means for raising the front end of the kitchen unit in the transport position and for supporting the kitchen unit directly from the floor of the vehicle through the ramp means, rather than through the mounting means, in the transport position.

6. The invention defined in claim 1 wherein the part of the floor which is lowered comprises a bottom floor section and floor section sidewalls about the periphery of the floor section and extending upwardly to maintain enclosure of that part of the floor.

7. The invention defined in claim 6 wherein each floor section sidewall comprises at least two telescoping sections.

8. The invention defined in claim 1 wherein the floor lowering means includes lifting means for lifting the lowered part of the floor back to the level of the rest of the floor.

9. The invention defined in claim 8 wherein the lifting means include a cable attached to each corner of the part of the floor which is lowered and trained-over pulleys and connected to a windup reel.

10. The invention defined in claim 9 including a hand crank attached to the windup reel.

11. The invention defined in claim 1 wherein the sidewalls, ceiling and floor of the kitchen unit form a rectangular module dimensioned to fit closely within the rear opening.

12. The invention defined in claim 11 wherein the kitchen unit includes a door in the rear wall.

13. The invention defined in claim 11 wherein the kitchen facilities include counters along the sidewalls and cabinets over the counters and wherein a stove and a sink are built into the counters.

14. The invention defined in claim 13 including a water container built into one of the cabinets above one of the counters.

15. The invention defined in claim 13 including a container space for an ice chest built into one of the counters.

16. The invention defined in claim 1 wherein said mounting means include a guide member attachable to the floor of the vehicle and rail members movable within the guide member and completely disconnectable from the guide members to remove the kitchen unit from the vehicle for storage when it is not needed in the vehicle.

17. The invention defined in claim 16 including a dolly for transporting the kitchen unit when it is removed from the vehicle and for aligning the rail members with the guide members when the kitchen unit is inserted into the vehicle.

18. A self-contained kitchen unit for insertion through the rear opening of a vehicle having a body providing an enclosed space behind the driver and rear doors providing a rear opening in the body which is substantially the full interior height and width of the vehicle body, said kitchen unit comprising, sidewalls and a ceiling and a floor connecting the side walls, mounting means for mounting the kitchen unit in the vehicle for movement between a first, transport position in which the unit is completely contained within the vehicle and a second, operative position in which a substantial part of the unit extends outside the rear opening of the vehicle, and floor lowering means for lowering a part of the floor to ground level in the second, operative position to provide standup space in that part of the kitchen unit and wherein the mounting means include guide members attached to the floor of the vehicle and rail members attached to the side walls and movable within the guide members and including a removable stop coacting with the guide members and the rail members which prevents complete disconnection between the guide members and rail members when the stop is in place and which permits disconnection of the rail members from the guide members when the stop is removed.

19. A self-contained kitchen unit for insertion through the rear opening of a vehicle having a body providing an enclosed space behind the driver and rear doors providing a rear opening in the body which is substantially the full interior height and width of the vehicle body, said kitchen unit comprising, side walls and a ceiling and a floor connecting the side walls, mounting means for mounting the kitchen unit in the vehicle for movement between a first, transport position in which the unit is completely contained within the vehicle and a second, operative position in which a substantial part of the unit extends outside the rear opening of the vehicle, and floor lowering means for lowering a part of the floor to ground level in the second, operative position to provide standup space in that part of the kitchen unit, and wherein the side walls, ceiling and floor of the kitchen unit form a rectangular module dimensioned to fit closely within the rear opening, and wherein the kitchen facilities include counters along the side walls and cabinets over the counters and wherein a stove and a sink are built into the counters, and including a container space for an ice chest built into one of the counters, and including a tabletop positionable against one side wall and over the stove and sink and engagable with the edge of the counter on the opposite side wall to provide a flat upper surface for sleeping space.

20. The invention defined in claim 19 wherein a part of the counter top above the ice chest space comprises two panels, one panel being connected to the stationary counter by a hinge along one edge and the second panel being connected by a hinge along the opposite edge so as to be foldable back under the one panel during normal use and extendable to engagement with a counter on the opposite sidewall to provide an extension of the flat upper surface.

21. The invention defined in claim 20 wherein the forward end of the kitchen unit is open to the interior of the vehicle and including a bench having the same height as the vertical height of the counters from the floor of the kitchen unit and having the same length as the width of the kitchen unit so as to be movable against the inner ends of the sidewall counters to provide a further extension of the flat upper surface.

22. A self-contained kitchen unit for insertion through the rear opening of a vehicle having a body providing an enclosed space behind the driver and rear doors providing a rear opening in the body which is substantially the full interior height and width of the vehicle body, said kitchen unit comprising, side walls and a ceiling and a floor connecting the side walls, mounting means for mounting the kitchen unit in the vehicle for movement between a first, transport position in which the unit is completely contained within the vehicle and a second, operative position in which a substantial part of the unit extends outside the rear opening of the vehicle, and floor lowering means for lowering a part of the floor to ground level in the second, operative position to provide standup space in that part of the kitchen unit, and wherein the side walls, ceiling and floor of the kitchen unit form a rectangular module dimensioned to fit closely within the rear opening, and wherein the forward end of the kitchen unit is opened to the interior of the van, and wherein the van vehicle has a rear bench seat extending across the vehicle behind the driver's seat, said kitchen unit is dimensioned to fit entirely within the van vehicle in the transport position while leaving space behind the bench seat for the seating of rear facing passengers and wherein the bench seat includes a forward facing back section, a forward facing seat section, a hinged connection between said sections for moving the forward facing back section between an upright position and a folded flat position and wherein the bench seat includes a second rear facing back section and a hinged connection to the top of the forward facing rear back section for moving the rear facing back section between an upright position and a horizoantal position and including a bench which forms a seat portion for the rear facing back section in the upright position of the back section.

23. The invention defined in claim 22 wherein the bench includes two bench members which together form a normal seat depth and which are separable when the bench seat is folded flat so that one bench member can be placed between the forward facing seat section and the driver's seat and the other bench member can be placed against the inner ends of the counters of the kitchen unit to form extensions of the flat surfaces for sleeping.

24. A self-contained, removable kitchen unit for vehicle of the kind having a body providing an enclosed space behind the driver and rear doors providing a rear opening in the body which is substantially the full interior height and width of the vehicle body, said kitchen unit comprising, a rectangular module having two side walls, a rear end wall, a ceiling, and a floor having a dropped down part joined together to provide a kitchen unit which is itself completely enclosed except for a front end open to the interior of the vehicle, and dimensioned to be movable through the rear opening, kitchen facilities built into the interior of the module adjacent the inner side of at least one of the walls mounting means mounting the kitchen unit for insertion into the interior of the vehicle to a transport position wherein the unit is completely contained within the vehicle and for complete removal from the vehicle to a storage position wherein the unit is completely removed from the vehicle means for lowering to ground level said drop down part of the floor which extends outside the rear opening in the operative position to provide standup space in that part of the kitchen unit, and wherein the drop down part of the floor is so located with respect to said kitchen facilities as to provide access to the kitchen facilities in a working relation when the drop down part of the floor is lowered to provide such standup space.

25. The invention defined in claim 24 wherein the mounting means include support members effective to guide the kitchen unit into and out of the vehicle and to support the kitchen unit at an operative position wherein the module is partially retracted from the vehicle and a substantial part of the module projects outside the rear opening.

* * * * *